DOUBLE CHANNEL SPECTRUM ANALYZER

Filed Jan. 14, 1965

INVENTOR
HYMAN HURVITZ

BY: Hurvitz & Rose

ATTORNEYS 3,364,426

DOUBLE CHANNEL SPECTRUM ANALYZER

Hyman Hurvitz, 326 Woodward Bldg., Washington, D.C. 20005

Filed Jan. 14, 1965, Ser. No. 425,525
8 Claims. (Cl. 324—77)

ABSTRACT OF THE DISCLOSURE

A spectrum analyzer employing separate superheterodyne channels for a common band of frequencies to be analyzed, the two channels having double conversion facilities employing separate local oscillators which scan in opposite senses, but which are so correlated in respect to instantaneous values that each frequency in the common band is concurrently supplied to a correlator, which in turn generates a visual display.

The present invention relates generally to superheterodyne scanning spectrum analyzers and more particularly to scanning spectrum analyzers which operate as correlators in order to enhance the selectivity obtainable in such analyzers by virture of intermediate filter selectivity alone.

The conventional spectrum analyzer of the scanning superheterodyne type achieves selectivity only in its I.F. filter. As filter selectivity is increased, i.e. filter bandwidth decreased, scanning rate must be correspondingly decreased. For example, to achieve 1 c.p.s. selectivity i.e. if I.F. bandwidth is 1 c.p.s. scan rate must approximate 1 c.p.s. per second. To scan a 10,000 c.p.s. band then requires at least 10,000 seconds, about three hours. Additionally, it is nearly impossible to achieve such selectivity even with crystal filters.

In accordance with the present invention greater selectivity of a scanning spectrum analyzer of the superheterodyne type can be achieved than is available in an I.F. filter. The result is achieved by two superheterodyne receivers in parallel, which are scanned in synchronism, which may utilize similar I.F. amplifiers but two local oscillators which are different in the two receivers. Values for the I.F. filters are selected so that for any common output frequency the outputs of the receivers are cophasal for only one set of local oscillator frequencies, the I.F. filters introducing opposite phase shifts for all other local oscillator frequencies. The outputs of the receivers are compared by a correlator circuit, which is phase sensitive and provides maximum output for two signals of the same frequency only if these are cophasal, and zero output for 90° phase. Since some I.F. filters introduce a 45° phase shift at each half power point there will be zero output from the system at the half power points of the I.F. filters of the receivers. The apparent resolution of the system is thus radically decreased, i.e. effective band width is decreased, with respect to filter band width. Since the filters can be broader than is the case in the prior art if presently available selectivities are to be achieved, the filter can be cheaper and, also, rate of scan can be increased for the wider filters.

It is an object of the invention to provide a scanning spectrum analyzer of the superheterodyne type, which achieves high resolution by means of wide I.F. filters, and achieves this by arranging the analyzer to be capable of utilizing correlator techniques.

The above and still further objects, features and advantages of the present invention will become apparent upon consideration of the following detailed description of one specific embodiment thereof, especially when taken in conjunction with the accompanying drawing, wherein.

Figure 1:
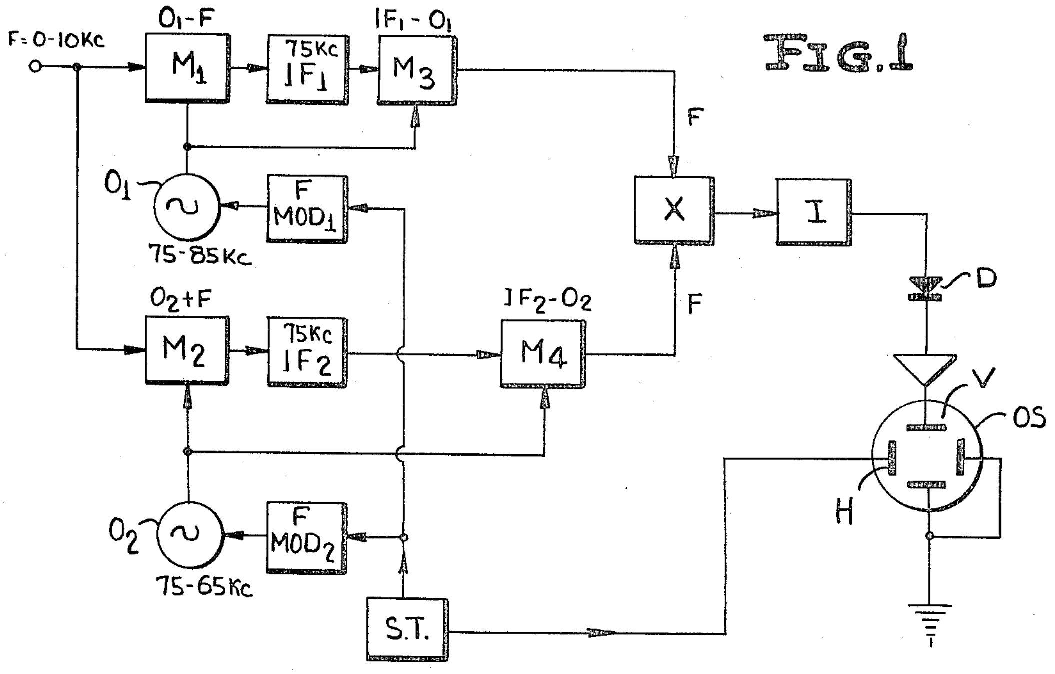
FIGURE 1 is a block diagram according to the invention.

In FIGURE 1, S is a source of a band of frequencies F, say in the band 0–10 kc. The band of frequencies F is applied to two mixers $M_1$, $M_2$, in parallel. The mixer $M_1$ is supplied with a local oscillator $O_1$ which scans from 75–85 kc., when frequency modulated by modulator $M_1$, in response to the output of sawtooth source ST. Mixer $M_2$ is supplied with the output of oscillator $O_2$, which scans from 75–65 kc., when frequency modulated by modulator $M_2$, in response to the output of ST. Accordingly, the output of $M_1$, is $O_1-F$, while the output of $M_2$ is $O_2+F$. Any frequency scanned through the I.F. filters $IF_1$ and $IF_2$, then moves in opposite directions, through the I.F. filters.

Figure 2A:
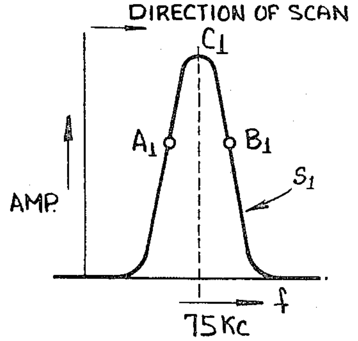
FIGURES 2A, 2B are filter selectively curves, useful in explaining the invention
Figure 2B:
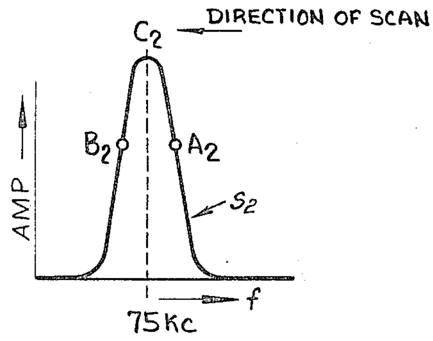

For example, if the selectivity curves of the filters $IF_1$ and $IF_2$ are $S_1$ and $S_2$ of FIGURES 2A and 2B, respectively, and if an input frequency is 1 kc., this frequency will be converted to points $C_1$, $C_2$, at the centers of the bands $S_1$ and $S_2$ when $O_1$ and $O_2$ are 76, and 74 kc. respectively. If $O_1$ and $O_2$ are simultaneously 75.9 and 74.1 kc. the I.F. frequencies will be 74.9 and 75.1 kc. respectively, i.e. $A_1$ and $A_2$, on opposite slopes of the selectivity curves. For simultaneous local oscillator frequencies of 76.1 and 73.9, on the other hand, the I.F. frequencies will be 75.1 and 74.9 kc., i.e. $B_1$ and $B_2$. These results assume a rather wide I.F., but only to simplify arithmetic. Analogous results will occur for any I.F. bandwidth. For the values given, the outputs of the I.F. filters will differ in phase by 90°, if the selected points are half power points, and the phase difference will only be 0° at $C_1$, $C_2$.

The outputs of filters $IF_1$ and $IF_2$ are remixed in mixers $M_3$, $M_4$, connected to oscillators $O_1$ and $O_2$, respectively, which returns the frequencies to their input values, 1000 c.p.s. in the example. The phases of $O_1$, $O_2$ are random, but this fact is not germane in the present system because the result of double heterodyning is to return the signal to its phase at input F, except for any change which may have occurred in the I.F. filters.

The outputs of modulators $M_3$, $M_4$ are multiplied in a four quadrant multiplier X, the output which is integrated in integrator I. The output of the integrator I is rectified, to provide only one polarity of output, amplified in video amplifier 11, and applied to the V plate of oscillograph OS. The output of ST is applied to the H plate. In operation, as the sawtooth provided by ST moves over its assigned set of values, the frequencies of F are converted in the same sequence and simultaneously to their I.F. frequencies. These will be different at all times except at the center of the I.F. filter, i.e. at $C_1$, $C_2$. As has been shown, $A_1$, $A_2$ are derived from the same value of input frequency but are different values of frequency. However, the second conversion steps, in $M_3$, $M_4$, regenerate the same frequencies, equal to the selected input frequency.

Any phase shift introduced by the I.F. filters is not removed by double conversion, but local oscillator frequencies and phases are removed. Correlating the 0–10 kc. outputs of the second mixers $M_3$ and $M_4$ provides a maximum value of output for application to plate V only at the center $C_1$, $C_2$ of the I.F. filters where the correlated signals have the same frequencies and phases.

Figure 3:
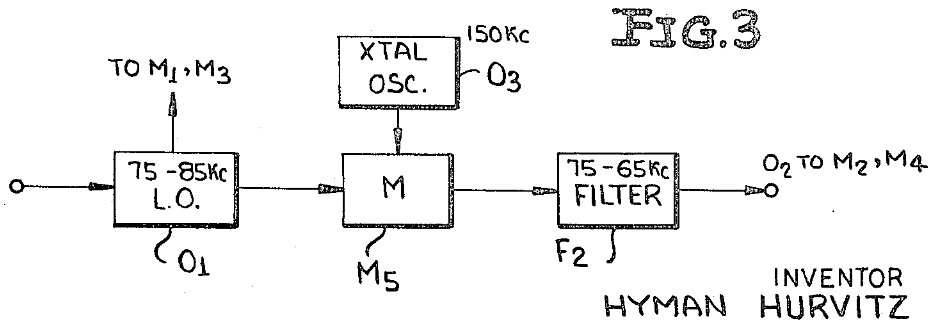
FIGURE 3 is a system for tracking two local oscillators with precision over a wide band of frequencies.

The system of FIGURE 1 requires that $O_1$ and $O_2$ track frequency, although their relative phases may be random. This is a troublesome problem in practice. To avoid the problem recourse is had to the system of FIGURE 3. In FIGURE 3 the local oscillations $O_2$ are in fact derived by mixing the output of $O_1$ with the output of a crystal controlled fixed frequency oscillator, $O_3$, in balanced mixer $M_5$, and the required $O_2$ oscillations derived from mixer $M_5$, by filter $F_2$.

Giving consideration to the operation of the system when two adjacent frequencies are present in the band F, these may be present simultaneously in the I.F. filters $IF_1$ and $IF_2$. However, while one of the frequencies is present at points $C_1$, $C_2$ of the selectivity curves of the I.F. filters, the other may be at $A_1$, $A_2$. The latter will then auto-correlate to zero and the one will auto-correlate to a maximum value. For points on the selectivity curve intermediate A and C, the other signal is (1) attenuated by the filter and (2) at different phases in the separate filters. These two effects are cumulative. For points outside A the product of correlation is negative since the total phase separation provided by the I.F. filter is greater than 90°. Signals are removed by diode D. There is produced, therefore, a display which is sharper for a single frequency than would be available due to I.F. selectivity alone and a radical ability to discriminate between adjacent frequencies.

While the system as disclosed utilizes frequencies $C_1$ and $C_2$ which are equal, and selectively curves for filters $IF_1$ and $IF_2$ which are the same, this is not essential to the invention. The filter characteristics can be different and/or have different center frequencies, providing appropriate modifications are made in oscillator frequencies, to assure that the same frequencies will pass the filters with zero phase shift at the same time.

While I have described and illustrated one specific embodiment of my invention, it will be clear that variation of the details of construction which are specifically illustrated and described may be resorted to without departing from the true spirit and scope of the invention as defined in the appended claims.

I claim:

1. A spectrum analyzer, comprising a source of a wide frequency spectrum, a pair of channels connected in parallel to said source, one of said channels including in cascade a first mixer, a first narrow band filter and a second mixer, a first local oscillator connected jointly to said first and third mixers, means scanning said first local oscillator over a band of frequencies exclusive of said wide frequency spectrum, the frequencies of said first local oscillator during said scanning and of said first narrow band filter being selected to scan the frequencies of said wide frequency spectrum in a predetermined sequence and in a predetermined direction through said first narrow band filter, the other of said channels including in cascade a third mixer, a second narrow band filter, and a fourth mixer, a second local oscillator connected to said third and fourth mixers, means scanning said second oscillator over a band of frequencies exclusive of said wide frequency spectrum, the frequencies of said second local oscillator during its scanning and of said second narrow band filter being selected to scan the frequencies of said wide band spectrum in said predetermined sequence and in a predetermined direction opposite to the first mentioned predetermined direction through said second narrow band filter, means multiplying the outputs of said second and fourth mixers occurring within said wide frequency spectrum to form a product, means integrating said product to provide an integrated output and means displaying said integrated output as a function of the frequencies of said wide frequency spectrum.

2. The combination according to claim 1 wherein said filters are substantially identical.

3. In a spectrum analyzer for analyzing a broad frequency spectrum, a first channel, a second channel, means applying said broad frequency spectrum to said channels in parallel, each of said channels having an output terminal, said channels including means for providing corresponding frequencies of said broad frequency spectrum in sequence simultaneously at said output terminals, each of said channels including a source of local oscillations, and means scanning said local oscillators in opposite directions in the separate channels.

4. The combination according to claim 3 wherein each of said channels includes in cascade a first heterodyne converter, a narrow band filter, and a second heterodyne converter, said converters of each channel having a common one of said sources of local oscillations.

5. The combination according to claim 3 wherein is further provided means for correlating the signals at said output terminals, and means for displaying a plot of the output of said means for correlating against frequencies of said broad band spectrum.

6. The combination according to claim 4, wherein is further provided means for correlating the signals at said output terminals, and means for displaying a plot of the output of said means for correlating against frequencies of said broad band spectrum.

7. In a spectrum analyzer for analyzing a broad frequency spectrum,
a first channel,
a second channel,
means applying said broad frequency spectrum to said channels in parallel,
each of said channels being a heterodyne channel and including a scanning local oscillator,
means scanning said local oscillators in respectively opposite senses of scan simultaneously, and
correlator means connected to the outputs of said channels for providing a display of amplitude versus frequency.

8. The combination according to claim 7 wherein said channels provide always signals of identical frequency to said correlator means.

References Cited

UNITED STATES PATENTS 3,182,256 5/1965 Andrew ............ 324—77

RUDOLPH V. ROLINEC, *Primary Examiner.*

P. F. WILLE, *Assistant Examiner.*